(12) United States Patent
Foss et al.

(10) Patent No.: US 8,740,297 B1
(45) Date of Patent: Jun. 3, 2014

(54) SEAT WITH REVERSIBLE SEAT BACK

(75) Inventors: Charles Dean Foss, New Smyrna Beach, FL (US); Aaron King Reimann Dale, Cocoa Beach, FL (US); Spencer Dewitt Traynom, New Smyrna Beach, FL (US); Richard Jay Garelick, Minneapolis, MN (US)

(73) Assignee: Boston Whaler, Inc., Edgewater, FL (US)

( * ) Notice: Subject to any disclaimer, the term of this patent is extended or adjusted under 35 U.S.C. 154(b) by 265 days.

(21) Appl. No.: 13/282,763

(22) Filed: Oct. 27, 2011

(51) Int. Cl.
*B60N 2/64* (2006.01)
*B60N 2/20* (2006.01)

(52) U.S. Cl.
USPC ............................ 297/95; 297/94; 297/354.11

(58) Field of Classification Search
USPC ................. 297/94–104, 354.11, 233, 452.48, 297/354.1, 373, 357
See application file for complete search history.

(56) References Cited

U.S. PATENT DOCUMENTS

| | | | |
|---|---|---|---|
| 461,198 A * | 10/1891 | Henry | 297/101 |
| 489,562 A * | 1/1893 | Johnston | 297/97 |
| 2,466,204 A * | 4/1949 | Brown | 297/115 |
| 2,679,653 A | 6/1954 | Divan-Bed | |
| 3,379,471 A | 4/1968 | Dalziel | |
| 5,517,706 A | 5/1996 | Kashima et al. | |
| 5,718,479 A | 2/1998 | Rautenbach | |
| 6,199,945 B1 | 3/2001 | Kim | |
| 6,283,059 B1 | 9/2001 | Scully, Jr. | |
| 6,488,333 B2 | 12/2002 | Kim | |
| 6,494,531 B1 | 12/2002 | Kim | |
| 6,883,458 B2 | 4/2005 | Huse | |
| 6,945,190 B1 | 9/2005 | Frandsen | |
| 6,988,774 B1 * | 1/2006 | Elzenbeck | 297/452.56 |
| 7,172,252 B2 | 2/2007 | Henning | |
| 7,237,845 B2 * | 7/2007 | Mulmed | 297/440.14 |
| 7,281,761 B2 * | 10/2007 | Brown et al. | 297/95 |
| 7,484,795 B2 | 2/2009 | Saint-Jalmes et al. | |
| 7,523,989 B2 * | 4/2009 | Wieland et al. | 297/440.13 |
| 7,661,382 B2 | 2/2010 | Wood et al. | |
| 2006/0076819 A1 * | 4/2006 | Burch | 297/452.18 |
| 2009/0146477 A1 * | 6/2009 | Yamada et al. | 297/354.1 |

* cited by examiner

*Primary Examiner* — David R Dunn
*Assistant Examiner* — Timothy J Brindley
(74) *Attorney, Agent, or Firm* — Malin Haley DiMaggio & Bowen, P.A.

(57) ABSTRACT

A reversible seat comprising a backrest, a seat bottom, two guide bars, and two corresponding backrest support assemblies. The guide bars are attached to and disposed on either side of said seat bottom and are disposed on the outside of a base assembly of the seat bottom. The backrest is attached to and disposed between the backrest support assemblies. The backrest support assemblies include a plurality of spindles and a spindle carrier. The spindles of each assembly are in rotational communication with their respective guide bar, providing a sliding engagement. The backrest is pivotably engaged with the backrest assemblies so that it can be adjusted depending on the seating position. The backrest assemblies translate longitudinally across guide bars to provide a plurality of seating positions. The backrest assemblies may also include locking members that engage the base assembly of the seat bottom for securing the backrest in place during use.

12 Claims, 6 Drawing Sheets

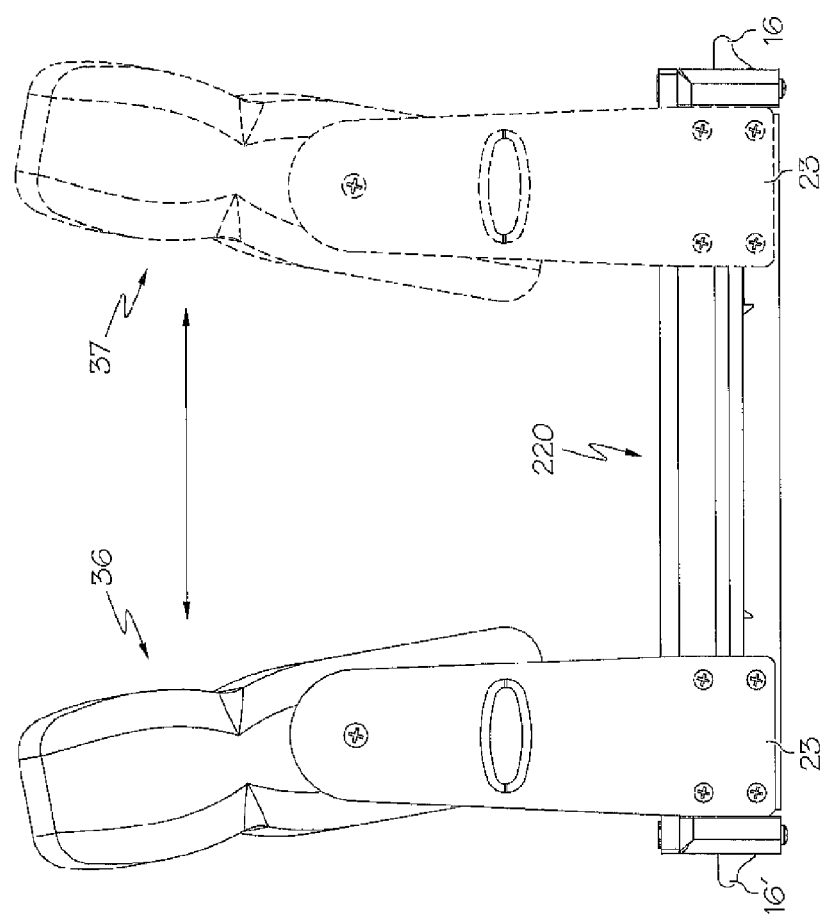

SEAT WITH REVERSIBLE SEAT BACK

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to seats and seating for moving vehicles and more specifically to a seat having a reversible seatback for use on marine vessels.

2. Description of Related Art

Many vehicles including cars, airplanes, buses, and marine vessels have incorporated reversible and modular seats to accommodate seating in both a forward and aft position. Specifically with regard to marine vessels, it is often desirable to provide a reversible seating surface in order for a passenger to enjoy a forward seating position when the vessel is in motion and an aft seating position when sunbathing, fishing, cruising, or the like.

There are a variety of ways in which reversible seats have been implemented. Some systems using a swivel mounted seat back that rotates around the base of the seat. These swivel systems are disadvantageous because they generally require a large amount of free space around the seat base in order for the seat back to have sufficient clearance to swivel between forward and aft positions. Alternative systems provide a pivoting seat back which utilizes a support on either side of the seat back pivotally connected to a support below the seat. These are often found on center console seats on marine vessels and are not ideal because they require the use of complex hardware mounted at a position extending far below the seat, usually on a fiberglass support base. Such systems are bulky and occupy a large amount of operational space. Other alternative systems provide a pivoting system whereby the entire seat, including the seat base and the seat back, rotates 180 degrees. These systems again require a substantial amount of free space to operate, and are not useful in tight-fitting spaces.

The above described reversible seat systems, and others, have been described in various patents and patent applications. For example, U.S. Pat. No. 7,661,382 to Wood et al., discloses a reversible seat, in which the seat back is pivotally connected to the seat bottom. The seat rotates and pivots about two primary horizontal axes, such that in a first position, the seat is of a conventional nature, facing the bow of the boat. The seat can be pivoted and rotated forward, flipping it 180 degrees, and the seat back can be pivoted upward about the seat bottom such that the seat is facing aft.

U.S. Pat. No. 7,484,795 to Saint-Jalmes et al illustrates a movable vehicle seat having a sitting portion, a moveable back, and a first guide mechanism configured to move the back from a first edge of the sitting portion to an opposite second edge of the sitting portion. The back is attached to a moveable element in the form of a stirrup, wherein the stirrup is supported by a base. The seat back is optionally configured to rotate to allow the ergonomic curve of the seat back to be properly oriented depending on the lateral position of the seat back.

U.S. Pat. No. 6,199,945 to Kim discloses several different designs for a reversible occupant travel seat, in which the back rest section is movable from a forward and aft position, respectively, along a longitudinal axis. The device includes a flanged base rail, internal track, and guide rail assembly, allowing the reversible back rest to be selectively located by a passenger.

U.S. Pat. No. 6,883,458 to Huse describes a boat seat assembly having a seating platform including first and second seat bottoms and a first and second seatback, a seat mechanism for moving the platform between the flat position and the seating position, a base supporting the mechanism, and a positioning system for maintaining the seating platform in the seating position and for allowing the seat platform to move to the flat position. Essentially, the system is an "accordion-like" seating system defining, in its upright position, two opposed seats and defining, in its flat position, a flat bed or lounger.

U.S. Pat. No. 6,283,059 to Scully, Jr. describes a convertible seat and deck apparatus including a frame having a first guide wall and a second guide wall. The first wall has a first elongated slot and a second elongated slot. The second guide wall has a third and fourth elongated slot. A seat back has a first seating surface, an opposite deck surface, and a first and second side. The seat back is moveable with respect to the frame between a first seating position and a second deck position.

U.S. Pat. No. 5,718,479 to Rautenbach describes a convertible seating arrangement which is configured as either a seat or a bed. The system includes a frame supporting a seat member on a track and a back member on a pair of pivoting ails. The seat member can slide fore and aft on the track while the back member can rotate 180 degrees on the arms and be locked in position thereon. With the seat member extended fowardly and the arms upright, the arrangement functions as a conventional seat. The seat member can be retracted and the back member is rotated through 180 degrees on the arms, defining a bed.

Accordingly, although the prior art provides varying arrangements for a multi-directional and multi-orientable seating surface, each requires complex linkages and moving part and/or utilizes a large amount of free space, particularly below the seating surface, to operate properly. Accordingly, there is a need in the art, and particularly with respect to marine vessels where space is already at a premium, to provide a reversible seat system that minimizes the necessary operational free space while still being comfortable, aesthetically pleasing, and easy to operate.

It is, therefore, to the effective resolution of the aforementioned problems and shortcomings of the prior art that the present invention is directed. However, in view of the reversible and modular seating systems in existence at the time of the present invention, it was not obvious to those persons of ordinary skill in the pertinent art as to how the identified needs could be fulfilled in an advantageous manner.

SUMMARY OF THE INVENTION

The present invention concerns various embodiments of a reversible seat that provides a substantial improvement over existing designs at least with respect to footprint and overall functionality. In some embodiments the reversible seat comprises a backrest, a seat bottom, a first guide bar, a second guide bar, a first backrest support assembly, and a second backrest support assembly. Each of the guide bars are attached to and disposed on either side of said seat bottom and, in some embodiments, are disposed on the outside of a base assembly or frame of the seat bottom. The backrest is attached to and disposed between the backrest support assemblies. Each of the backrest support assemblies include a vertical backrest support, a plurality of spindles, and a spindle carrier, wherein the spindles are disposed between a lower portion of the backrest support and said spindle carrier. The spindles of each assembly are in rotational communication with their respective guide bar, providing a sliding engagement. Accordingly, the backrest assemblies translate longitudinally across guide bars to provide a plurality of seating positions.

Further, the backrest is pivotably engaged with the upper portion of the two backrest support assemblies such that it can rotate in order to provide improved ergonomics depending on the seating position of the seat. Thus, the backrest may include one or more support plates which receive an upper pivot bar and a lower catch bar, which bars are fastened between the two backrest support assemblies. At least one of the backrest support assemblies may also include one or more locking members which are received by a corresponding slot in the base assembly of the seat bottom. The locking members secure the backrest and prevent unintentional movement of the backrest assembly along the guide bar when so desired.

Accordingly, it is an object of the present invention to provide an enhanced reversible seat for use in a wide variety of applications include marine vessels and other moving vehicles.

It is another object of the present invention to provide a reversible seat that is capable of providing at least two seating positions.

It is another object of the present invention to provide a reversible seat that requires minimal operating space and has a small footprint.

It is yet another object of the present invention to provide a reversible seat that does not require a large mounting base below the seating surface.

It is yet another object of the present invention to provide a reversible seat that is easy to operate and comfortable.

In accordance with these and other objects which will become apparent hereinafter, the instant invention will now be described with particular reference to the accompanying drawings.

BRIEF DESCRIPTION OF THE DRAWINGS

FIG. 6 is a side view of one embodiment of the present invention demonstrating both a forward seating position and an aft seating position.

DETAILED DESCRIPTION

Figure 1:
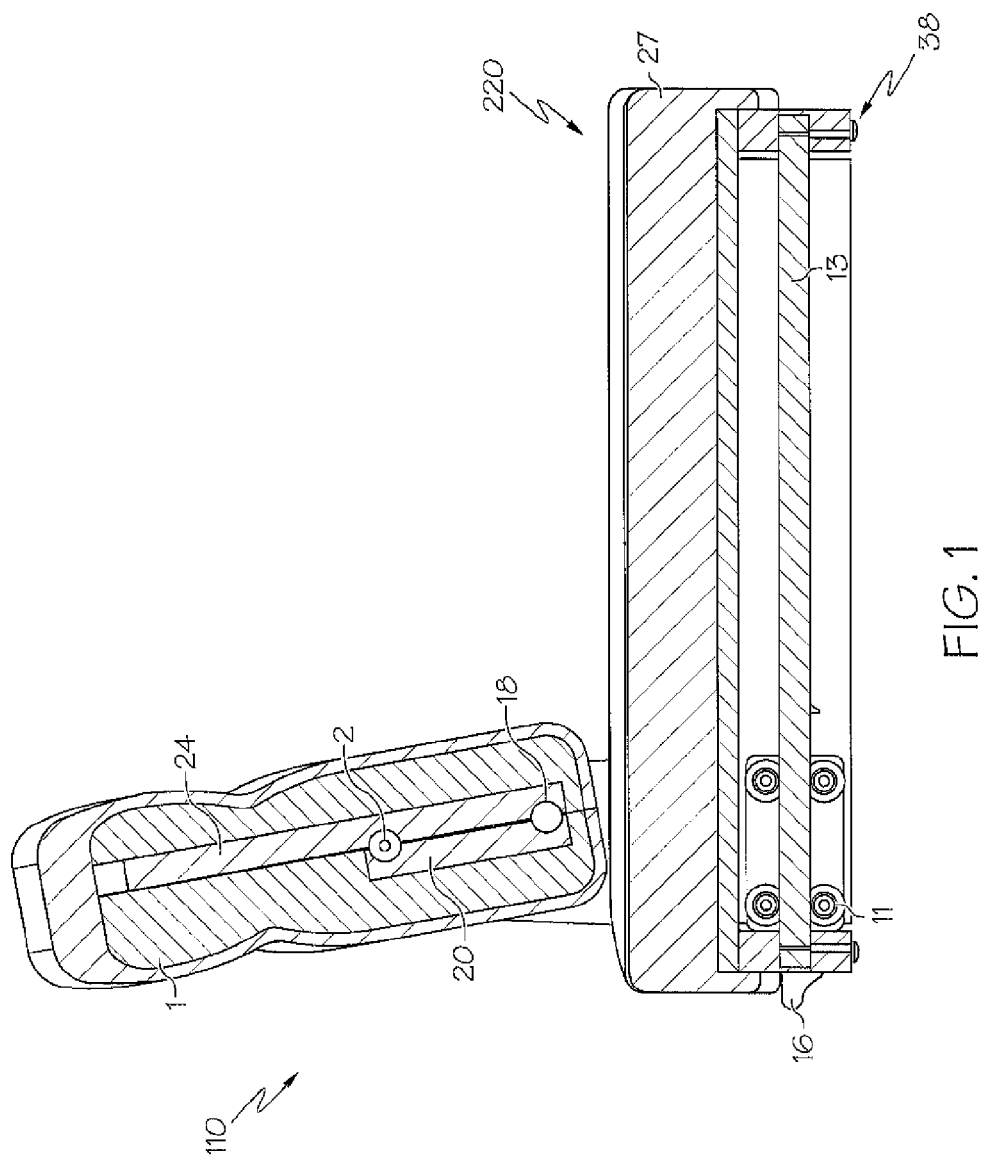
FIG. 1 is a cross-sectional side view of one embodiment of the reversible seat of the present invention.

With reference to FIG. 1, shown is backrest 110 and seat bottom 220 wherein backrest 110 is configured to operatively translate longitudinally across seat bottom 220 in order to provide a plurality of seating positions. Backrest 110 comprises a backrest cushion 1 surrounding an aft backrest plate 20 and a forward backrest plate 24. The upper portion of seat bottom 220 includes a seat bottom cushion 27 which is supported by a base assembly 38. As described in further detail below, backrest 110 is slidingly mounted to guide bars 13 of the base assembly 38 such that it can translate across seat bottom 220 to provide at least two seating positions.

Figure 2:
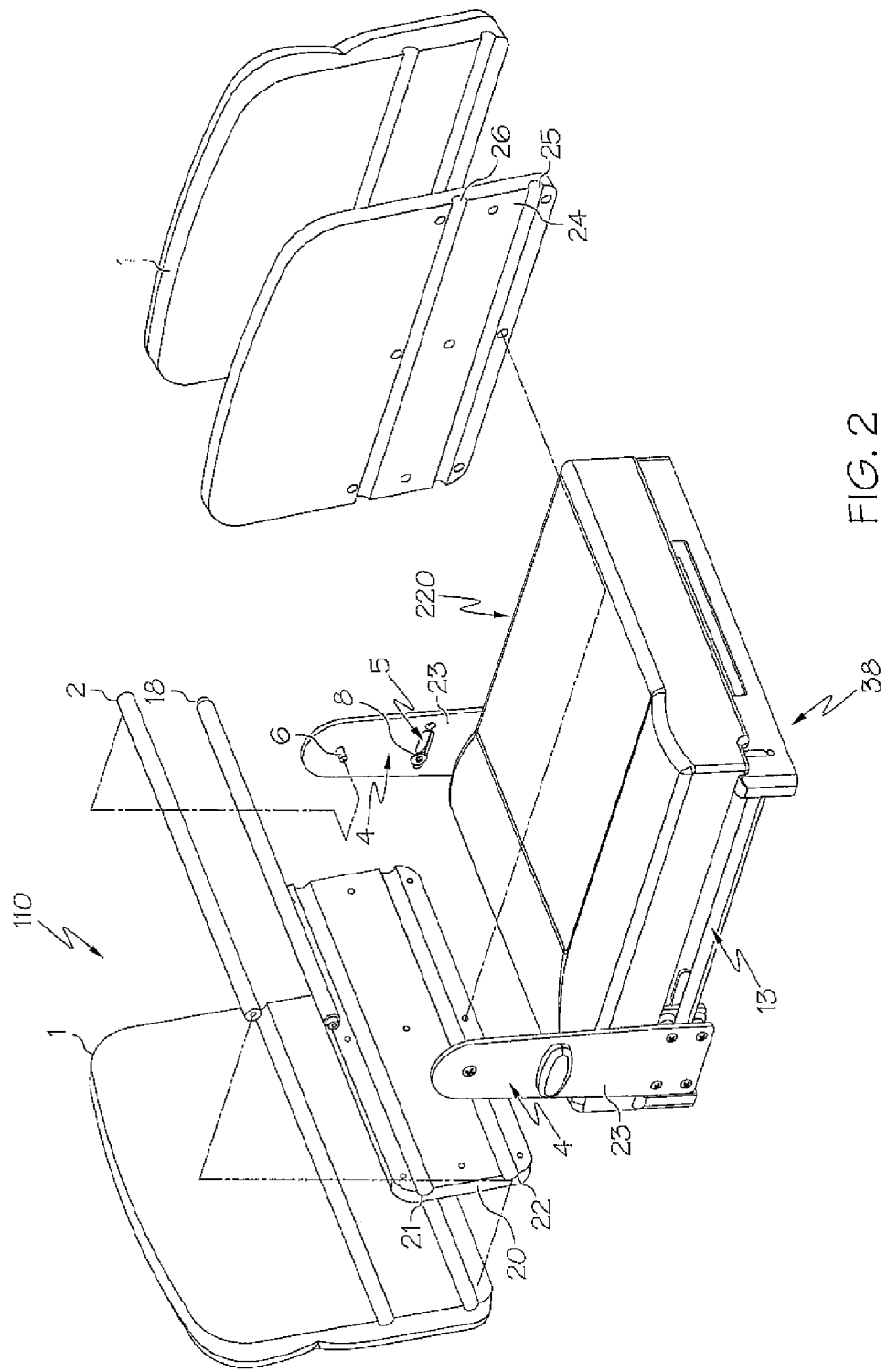
FIG. 2 is an exploded perspective view of one embodiment of the reversible seat of the present invention showing the arrangement of the backrest thereof.

FIG. 2 shows the assembly of backrest 110 and seat bottom 220 in more detail. Aft backrest plate 20 is a substantially planar member having an upper guide slot 21 and a lower guide slot 22 which are longitudinally disposed along the width of plate 20. Likewise, forward backrest plate 24 is a substantially planar member having an upper guide slot 26 and a lower guide slot 25 which are longitudinally disposed along the width of plate 24. In its assembled state, the aft plate 20 and forward plate 24 face each other such that their corresponding upper and lower guide slots, 21-26 and 22-25, are aligned, thus defining cylindrical guide slots. The upper guide slot 21-26 receives toggle support pivot bar 2 and the lower guide slot 22-25 receives backrest toggle support catch bar 18. It is further appreciated that plates 20 and 24 are substantially rigid, providing internal structural support for cushion 1 and assuring that backrest 110 is stable and in compliance with industry standards.

Backrest 110 is disposed between two substantially vertical backrest supports 4, which are the primary supports of backrest support assembly 23 which connects the backrest 110 to the seat bottom 220. Pivot bar 2 is disposed between the two supports 4 and is attached thereto by fasteners 6 which pass through the supports 4 and are received on either end of pivot bar 2. Catch bar 18 is also disposed between the two supports 4 and is attached on either end by fasteners 8 (See FIG. 6) which are received in toggle slots 5 of supports 4. This arrangement permits backrest 110 to rotate about pivot bar 2 with toggle slots 5 providing a positive stop to limit the rotational range of motion of backrest 110. The forward/aft rotational action allows backrest 110 to be ergonomically positioned relative to its lateral position with respect to seat bottom 220. The engagement of fastener 8 within slot 5 should be firm enough to resist rotation when no load is present, but loose enough to allow for manual repositioning. However, it is appreciated that when an individual is sitting in the seat, the lateral body weight applied against seat back 110 will be sufficient to keep it in place.

Figure 3:
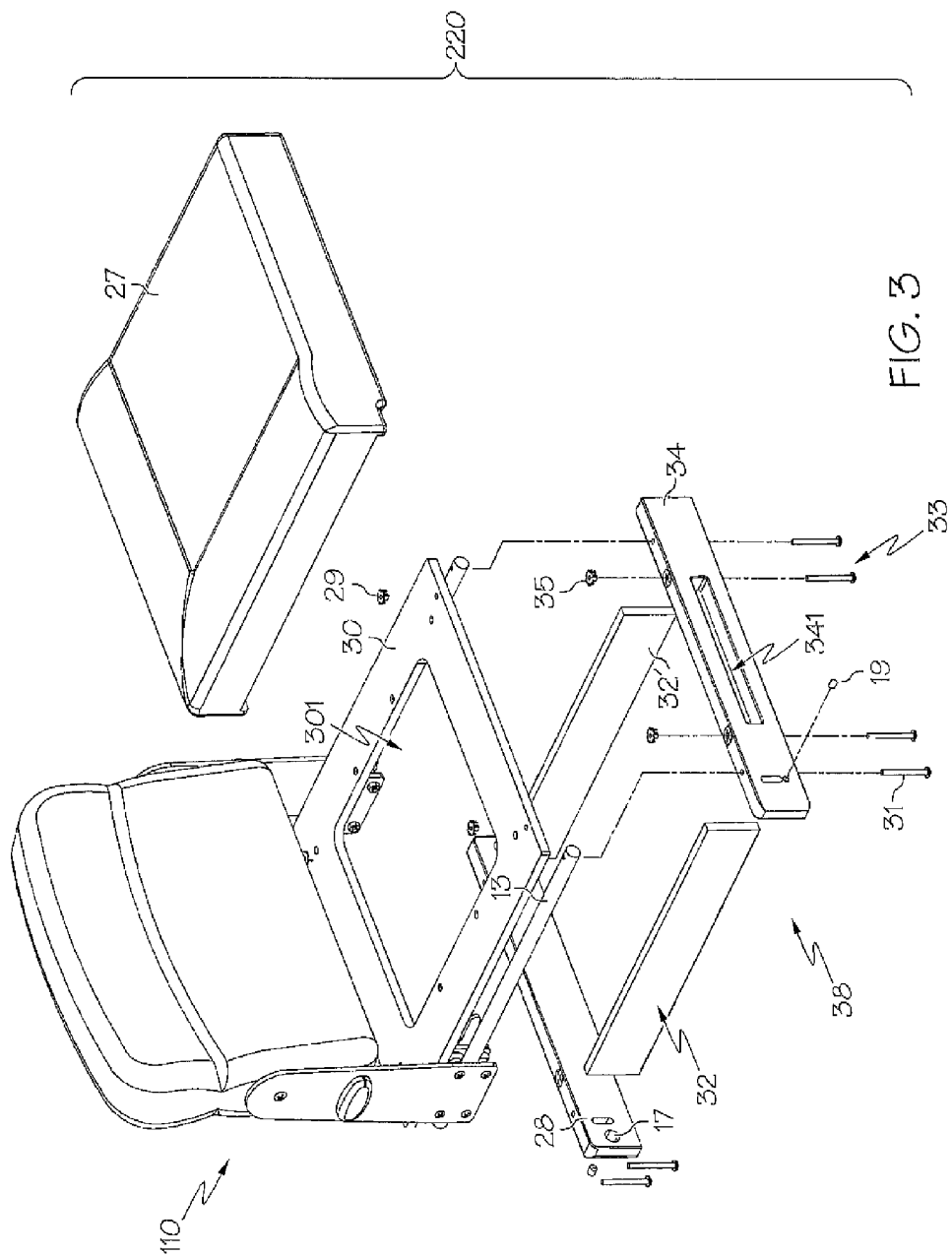
FIG. 3 is another exploded perspective view of one embodiment of the reversible seat of the present invention showing the arrangement of the seat bottom thereof.

FIG. 3 is another exploded view of one embodiment of the seat of the present invention, showing the arrangement of seat bottom 220. Base assembly 38 defines a frame comprising a horizontally disposed cushion support 30, two oppositely disposed longitudinal supports 32 and 32', aft base support 28, and forward base support 34. Cushion support 30 is secured to aft base support 28 and forward base support 34 by the engagement of primary seat fasteners 31 and primary seat nuts 29. Secondary seat fasteners 33 and secondary seat nuts 35 provide additional stability and securement for the base assembly 38. Cushion support 30 may include a relief 301 which is adapted to accept a fabric suspension weave or other deformable material thereacross to provide additional "give" in the seat bottom 220 during use. Forward base support 34 may optionally include an extension slot 341 which is adapted to receive an adjacent removable cushion or other extended seating surface, depending on the location and structure surrounding the reversible seat. Aft base support 28 may also include such an extension slot; however it is omitted from the drawings herein.

A guide bar 13 is located on the outside of each of the longitudinal supports 32 and is secured between aft base support 28 and forward base support 34. The ends of each guide bar 13 are secured within openings 17 which are located substantially toward the ends of each of the aft base support 28 and the forward base support 34. Additionally, a lock catch slot 19 is located on at least one end of each of the aft base support 28 and forward base support 34.

Figure 4:
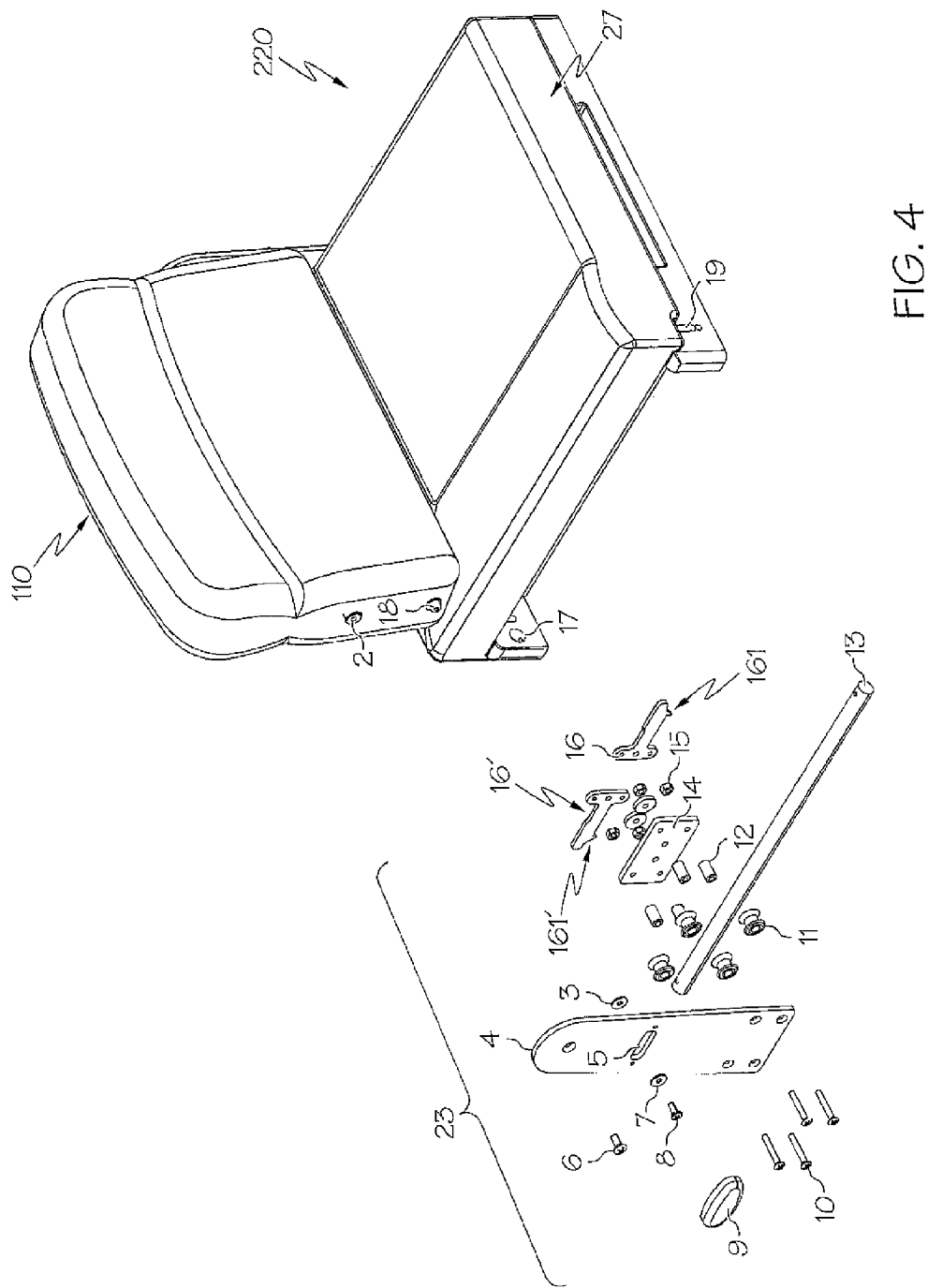
FIG. 4 is another exploded perspective view of one embodiment of the reversible seat of the present invention showing the arrangement of the support assembly thereof.

FIG. 4 is a detailed exploded view of the backrest support assembly 23 which provides the sliding engagement between backrest 110 and seat bottom 220. As described above, the ends of pivot bar 2 and catch bar 18 of backrest 110 are attached to upper portion of backrest support 4 by fastener 6 and fastener 8, respectively. Fastener 8 is provided in toggle slot 5 which allows catch bar 18 is slide laterally within the slot 5, limiting the range of motion of the pivoting action of backrest 110 about pivot bar 2. To that end, fastener 8 may pass through washers 3 and 7 which are provided on either side of support 4 in order to provide lateral support and stability for the sliding engagement of fastener 8 within slot 5. Toggle cover 9 may be provided over slot 5, on the outside of the supports 4, for protective and aesthetic purposes.

The lower portion of backrest support 4 secures spindles 11 which provide the sliding/translating mechanism for the backrest 110. In the depicted embodiment, four spindles 11 are in rotational communication with guide bar 13, providing a sliding engagement. In some embodiments, two spindles 11 are in contact with the top surface of guide bar 13 and another two spindles 11 are in contact with the bottom surface of guide bar 13. The spindles 11 are disposed between the lower portion of backrest support 4 and spindle carrier 14. A spindle bolt 10 is provided through support 4, through the bore of spindle 11, through spindle carrier 14 and secured on the inside surface of spindle carrier 14 by spindle nut 15. In some embodiments, a bushing 12 is disposed inside the bore of each spindle 11 providing a bearing surface to enhance the rotational action of each spindle 11 and acts as a shoulder to enhance the lateral stability of the spindles. Also attached to the inside surface of spindle carrier 14 are two oppositely oriented lock members, forward lock member 16 and aft lock member 16'. In some embodiments, each lock member 16/16' comprises a protruding tongue having a downward facing notch or tang 161/161' toward its distal end. In some embodiments, the proximal end of each lock member 16/16' is pivotably mounted to spindle carrier 14 and may be springingly engaged thereto. The tip of the distal end of each lock member 16/16' allows for manual activation of the lock member, which function will be described in further detail below.

Figure 5B:
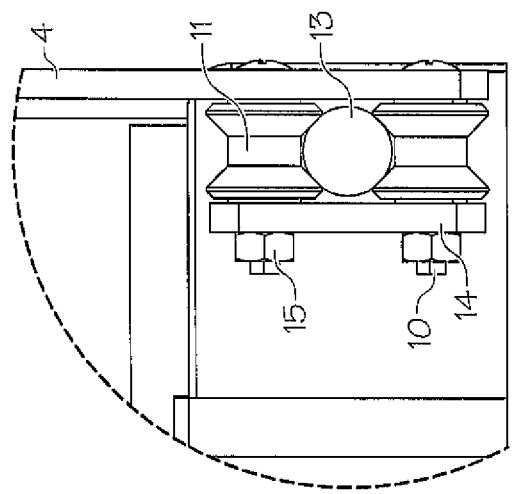
FIG. 5B is a close-up section view of FIG. 5A.
Figure 5A:
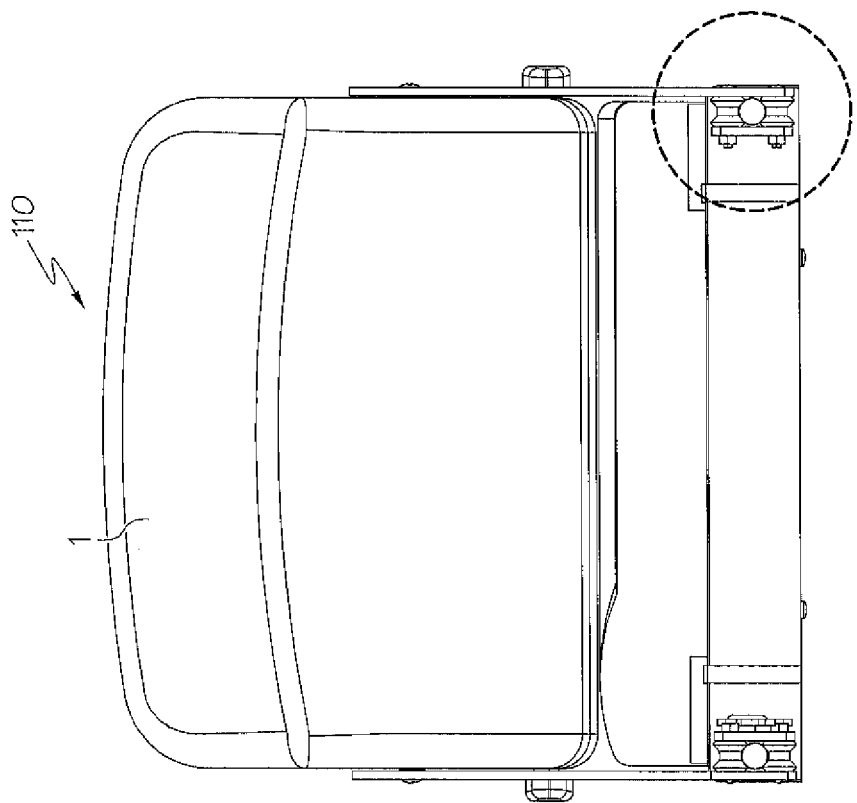
FIG. 5A is a cross-sectional rear view of one embodiment of the reversible seat of the present invention.

FIG. 5A is a rear sectional view of one embodiment of the reversible seat of the present invention and FIG. 5B is a close-up sectional view thereof, showing the arrangement of support 4, spindles 11, and spindle carrier 14. As shown, the spindles 11 are arranged above and below guide bar 13 such that upon the application of lateral force, the spindles rotate, causing the entire backrest 110 to translate along guide bar 13. The spindle-guidebar engagement also provides the necessary vertical support to keep backrest 110 substantially upright during use, while also preventing torsion and lateral flex of support 4. In some embodiments, spindles 11 have a double-flanged or "butterfly" configuration allowing them to rotate smoothly over the substantially cylindrical guide bar 13.

In operation, the reversible seat of the present invention provides at least two operatively selectable seating positions. FIG. 6 depicts two seating positions, a forward position 36 and an aft position 37, superimposed in a single figure. To enter forward position 36, the backrest 110 is translated aft along guide bar 13 (via spindles 11) until aft lock member 16' engages the lock catch slot 19 of aft base support 28. Lock member 16' is springingly connected to spindle carrier 14 such that when pressed into lock catch slot 19, it momentarily displaces upward until the notch 161' passes through the lock catch slot 19. At that point, the spring engagement causes lock member 16' to pivot downward, locking the assembly 23 into place via notch 161', and therefore preventing lateral movement of seatback 110. Further, seatback 110 should be pivoted about pivot bar 2 such that it is angled aftwardly, providing optimal ergonomics for an individual facing forward in the seat.

To change from forward position 36 to aft position 37, the distal end of lock member 16' is manually displaced upward, causing the lock member 16' to disengage from lock catch slot 19, freeing backrest 110 including support assembly 23. Forward lateral force is applied to backrest 110 causing it to translate forward along guide bar 13 (via spindles 11) until forward lock member 16 engages the lock catch slot 19 of forward base support 34. Again, lock member 16 is springingly connected to spindle carrier 14 such that when pressed into lock catch slot 19, it momentarily displaces upward until the notch 161 passes through the lock catch slot 19. At that point, the spring engagement retracts lock member 16 downward, locking the assembly 23 into place via notch 161', therefore preventing lateral movement of seatback 110. Seatback 110 should be pivoted about pivot bar 2 such that it is angled forwardly, providing optimal ergonomics for an individual facing aft in the seat.

It is appreciated that, in some embodiments, two guide bars 13 are provided, one on each side of the base assembly 38, each engaged with a support assembly 23 having the spindles 11 and spindle carrier 14 described above. In some embodiments, only one of the support assemblies 23 needs to include the lock members 16/16' and therefore lock catch slots 19 need only be provided on that corresponding end of the aft base support 28 and forward base support 34. Having lock members on both sides of the backrest 110 is optional if additional security and stability is desired, but it would tend to make the device somewhat more difficult to operate, having to simultaneously release two lock members at once in order to release the backrest 110.

For purposes of this disclosure, it is understood that use of the terms "aft" and "forward" are not limiting and should not be construed as referring to the aft of forward of a particular vessel. Rather, the terms are used in a relative sense to describe the two ends of the reversible seat and the corresponding positions of backrest 110. To that end, it is appreciated that present invention can be provided anywhere a reversible seat might be desired such as a moving vehicle (boat, car, airplane, motorcycle, bicycle, moped, snowmobile, or the like) or elsewhere. Additionally, the seat need not be limited to installations where the forward position 36 literally provides a front-ward seating position and the aft position 37 literally provides an aftward seating position relative to the vehicle (or other rigid body) in which it is installed. The reversible seat could equally as well be installed transversely to provide left and right (port/starboard) seating positions. Other installation locations and orientations are apparent to those skilled in the art.

It is further appreciated that the use of certain terminology within the description should not be construed as limiting in that alternatives would be readily apparent to those skilled in the art. For example, the term "fastener" may include any device so designed to function as a fastener including, but not limited to, a nut-bolt engagement, screws, rivets, nails, and the like.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A reversible seat, comprising:
a backrest and seat bottom, wherein said backrest comprises a cushion surrounding one or more backrest plates, said backrest plates including an upper guide slot and a lower guide slot, said upper guide slot receiving a pivot bar and said lower guide slot receiving a catch bar, said pivot bar and said catch bar each extending entirely through a width of said backrest;
said seat bottom including at least one guide bar;
said backrest disposed between and pivotably engaged with two backrest support assemblies;
wherein at least one of said backrest support assemblies is slidingly engaged with said at least one guide bar;
wherein said backrest operatively translates longitudinally across said seat bottom to provide a plurality of seating positions.

2. The reversible seat of claim 1, wherein said pivot bar is pivotably attached between said backrest support assemblies, and said catch bar is received in a toggle slot of each of said backrest support assemblies.

3. The reversible seat of claim 1, wherein said backrest support assemblies include a backrest support, a plurality of spindles, and a spindle carrier, said spindles disposed between said backrest support and said spindle carrier.

4. The reversible seat of claim 3, wherein said spindles are in rotational communication with said guide bar.

5. The reversible seat of claim 4, wherein at least two of said spindles are in contact with a top surface of said guide bar and at least two of said spindles are in contact with a bottom surface of said guide bar.

6. The reversible seat of claim 3, further comprising at least one locking member attached to said spindle carrier, said locking member adapted to selectively engage a lock catch slot on said seat bottom.

7. The reversible seat of claim 6, wherein said at least one locking member is springingly engaged with said spindle carrier.

8. A reversible seat, comprising:
a backrest, a seat bottom, a first guide bar, a second guide bar, a first backrest support assembly, and a second backrest support assembly;
wherein said backrest comprises a cushion surrounding one or more backrest plates, said backrest plates including an upper guide slot and a lower guide slot, said upper guide slot receiving a pivot bar and said lower guide slot receiving a catch bar, said pivot bar and said catch bar each extending entirely through a width of said backrest;
each of said first and second guide bars attached to and disposed on either side of said seat bottom;
said backrest disposed between and pivotably engaged with said first backrest support assembly and said second backrest support assembly;
said backrest support assemblies each including a backrest support, a plurality of spindles, and a spindle carrier, said spindles disposed between said backrest support and said spindle carrier;
said spindles of said first backrest support assembly in rotational communication with said first guide bar and said spindles of said second backrest support assembly in rotational communication with said second guide bar;
wherein said backrest assemblies translate longitudinally across guide bars to provide a plurality of seating positions.

9. The reversible seat of claim 8, wherein said pivot bar is pivotably attached between said backrest support assemblies, and said catch bar is received in a toggle slot of each of said backrest support assemblies.

10. The reversible seat of claim 8, wherein said seat bottom includes a horizontally disposed cushion support, a forward base support, an aft base support and two oppositely disposed longitudinal supports.

11. The reversible seat of claim 10, wherein said cushion support includes a relief adapted to accept a fabric suspension weave.

12. The reversible seat of claim 10, wherein said forward base support includes an extension slot adapted to receive an adjacent removable cushion.

* * * * *